Figure 3:
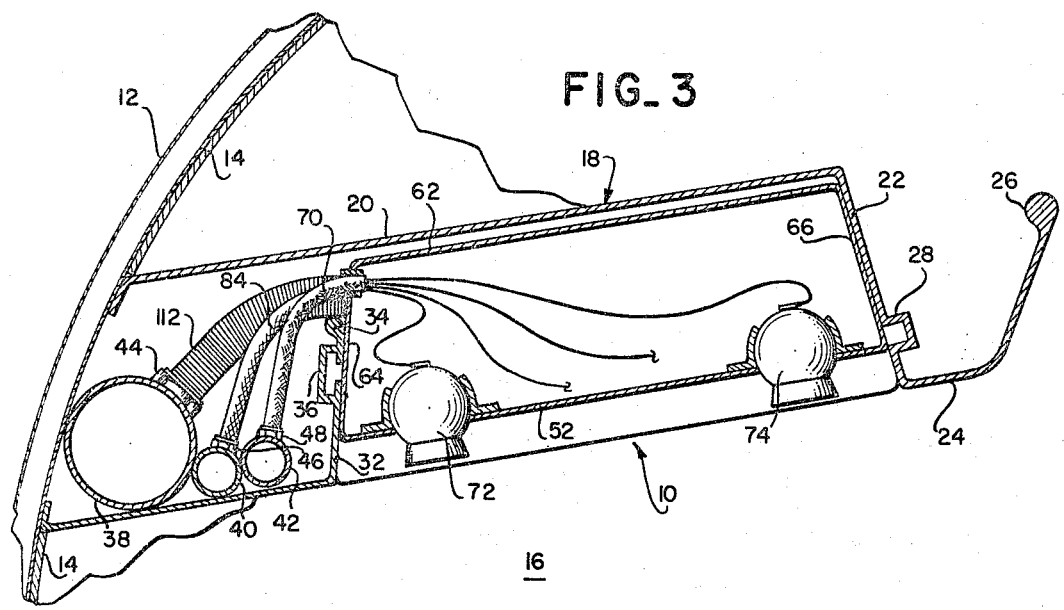

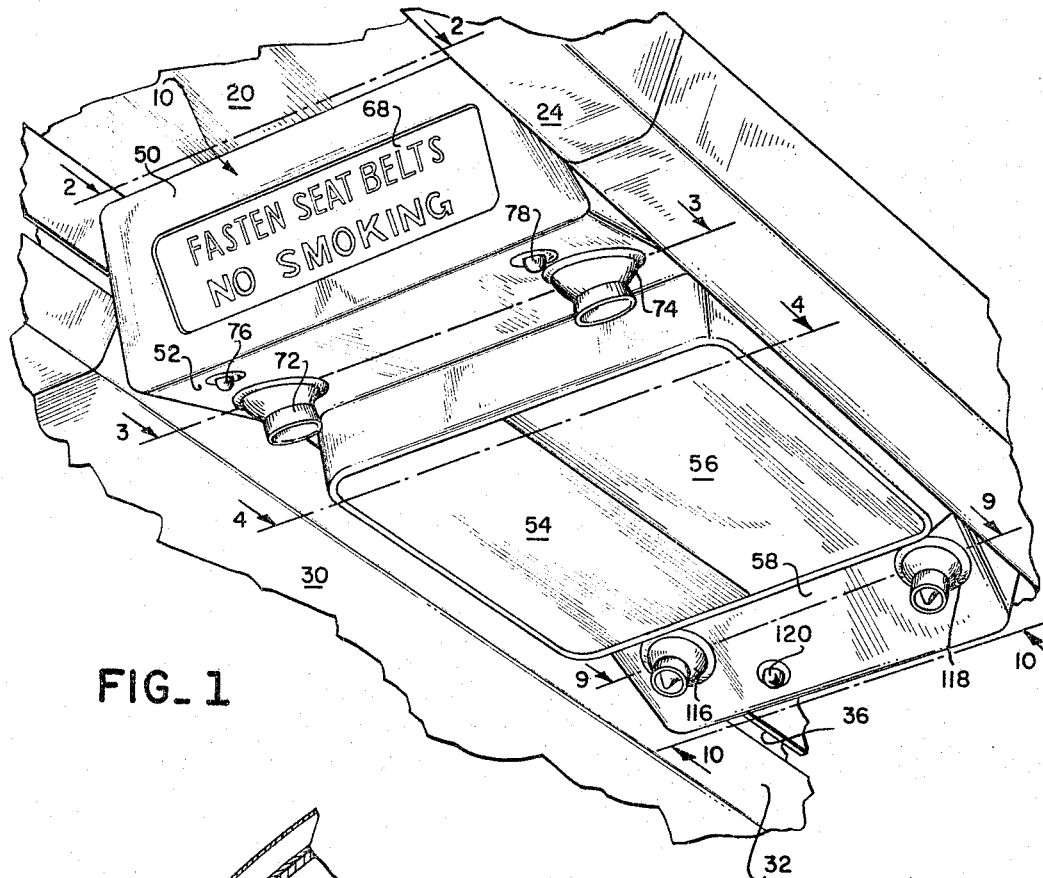
FIG_1
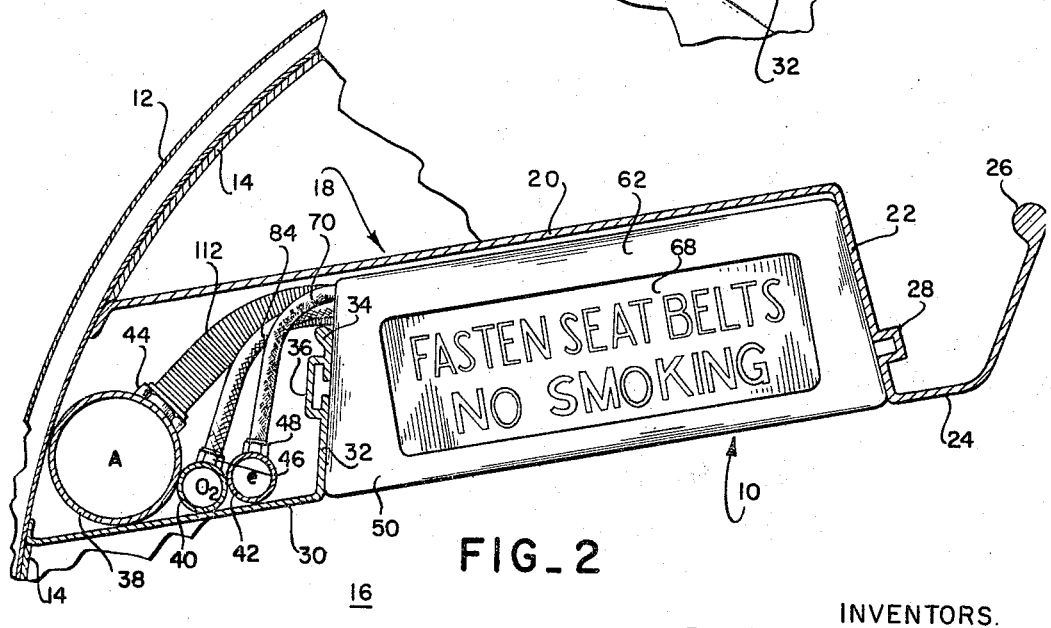
FIG_2
INVENTORS.
ROBERT J. ROBILLARD
RICHARD L. VERNON
BY *George Sullivan*
Agent

INVENTORS.
ROBERT J. ROBILLARD
RICHARD L. VERNON

BY *George Sullivan*
Agent

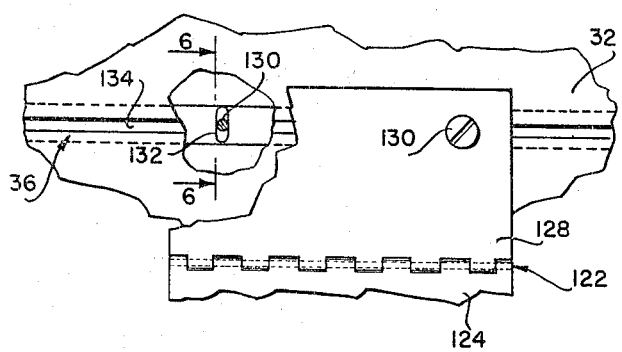
FIG_5
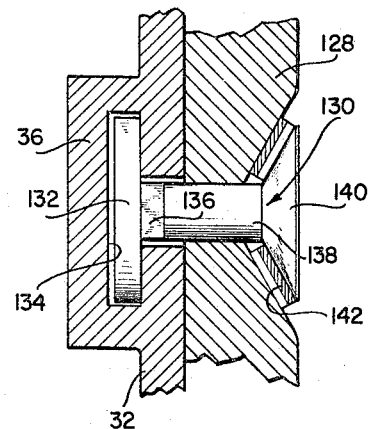
FIG_6
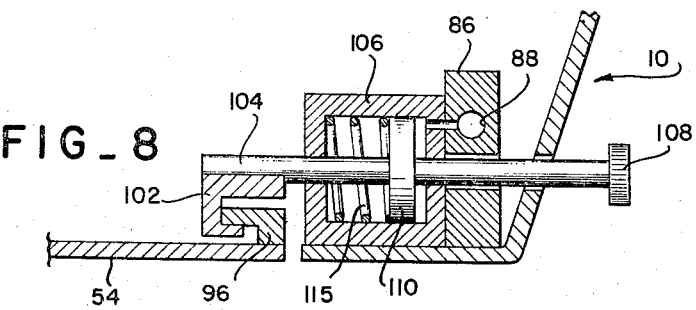
FIG_8
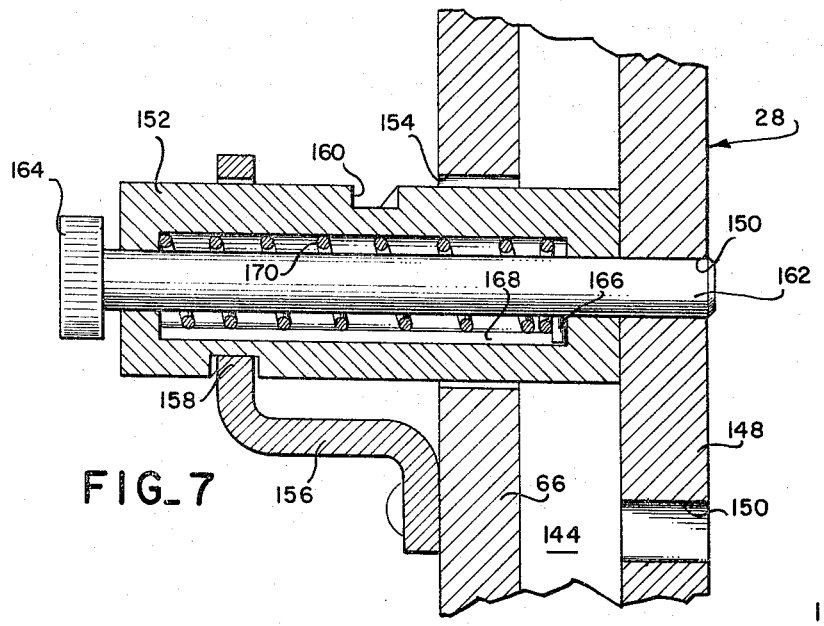
FIG_7
INVENTORS.
ROBERT J. ROBILLARD
RICHARD L. VERNON
BY George C. Sullivan
Agent July 11, 1967  R. J. ROBILLARD ETAL  3,330,506
ADJUSTABLE PASSENGER UTILITY CARRIER
Filed July 12, 1965  4 Sheets-Sheet 4
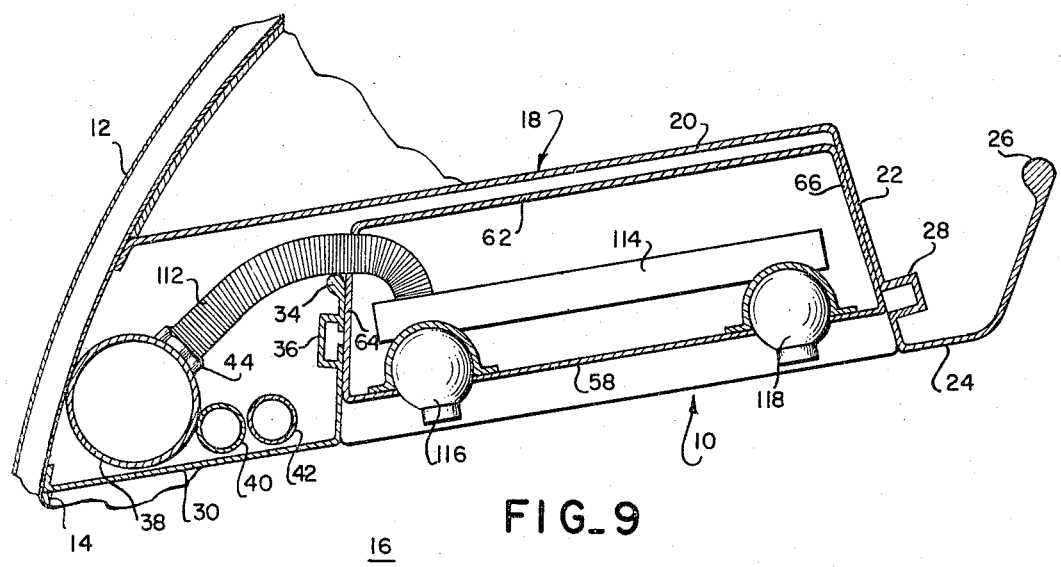
FIG_9
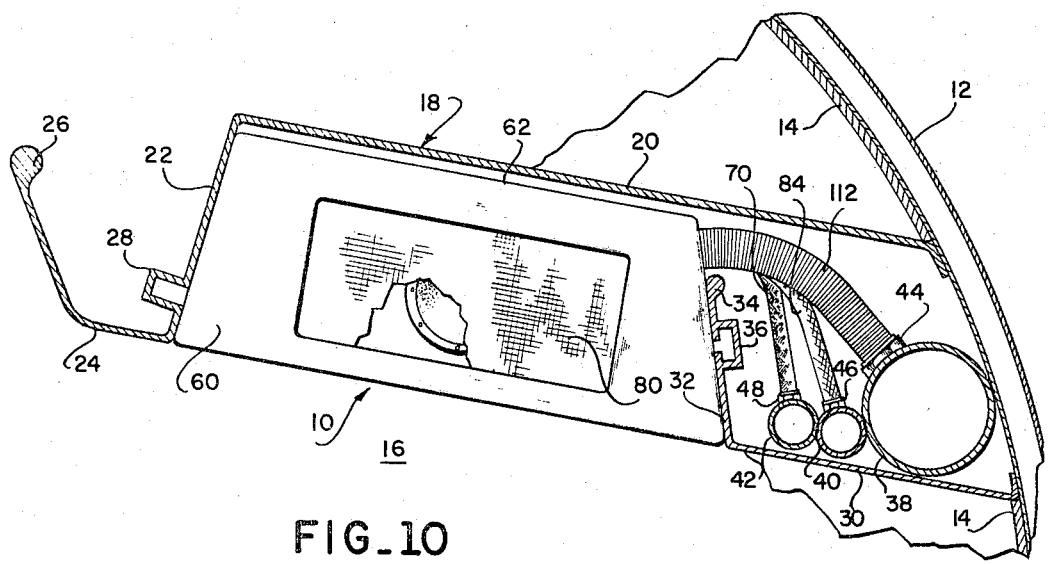
FIG_10
INVENTORS.
ROBERT J. ROBILLARD
RICHARD L. VERNON
BY George C. Sullivan
Agent

United States Patent Office 3,330,506
Patented July 11, 1967

3,330,506
ADJUSTABLE PASSENGER UTILITY CARRIER
Robert J. Robillard, Beverly Hills, and Richard L. Vernon, Glendale, Calif., assignors to Lockheed Aircraft Corporation, Burbank, Calif.
Filed July 12, 1965, Ser. No. 471,144
14 Claims. (Cl. 244—118)

This invention is directed to an adjustable passenger utility carrier particularly useful in the passenger space of aircraft and particularly useful to be related to the passenger seating in passenger aircraft.

Modern aircraft requires several services to be supplied to each individual passenger. These services are for his convenience, comfort, safety and information. In view of the fact that such services are preferably related to each passenger, it is desirable to have such services related to the passenger seats. Recent passenger aircraft have been equipped, however, with movable seats. Such movability of the seats permits the airline operating the aircraft to adjust the seat spacing so as to change the passenger density in the aircraft. Changes in seat spacing and in passenger density result from changes in passenger demand for each of the classes of service in the aircraft. Furthermore, an entire aircraft may be changed from one class of service to another, or only certain portions thus changed. In view of the fact that airlines are presently furnishing more classes of service, and are furnishing several classes of services on the same aircraft, the airlines require ease of adjustment of seat positioning, and even seat interchange so that density may be changed. Such seat adjustment requires changes in the passenger services supplied to each individual seat which are related to the seat location. Such services as reading lights and reading light switches, air vents, hostess call buttons and oxygen masks must be related to seat positioning. Furthermore, it is desirable to have informational services related to each seat. Thus, it is desirable to have the necessary signs and announcement loud speakers related in an intelligible position with respect to each seat. This requires that these services be longitudinally positionable of the aircraft when seat spacing is changed.

Accordingly, it is an object of this invention to provide an aircraft with longitudinally movable and lockable utility carrier which carries the required passenger service equipment.

It is another object of this invention to provide track structure arranged longitudinally of the aircraft and positioned above the seating therein which is adaptable to support a passenger utility carrier and permit the carrier to be moved therealong so that it may be related to seat spacing.

It is another object of this invention to provide an adjustable passenger utility carrier which contains reading lights, reading light switches, oxygen masks with automatic release structure therefor, individual air outlets, a hostess call button, illuminable passenger information signs and a loud speaker and arrange this carrier so that it is positionable with respect to the position of the seats within the aircraft.

It is a further object of this invention to provide release means whereby such a carrier can be released for longitudinal sliding, can be released so that it may hinge downwardly for inspection and service of its interior components and it may be released for removal.

Other objects and advantages of this invention will become apparent from the following description thereof.

Figure 4:
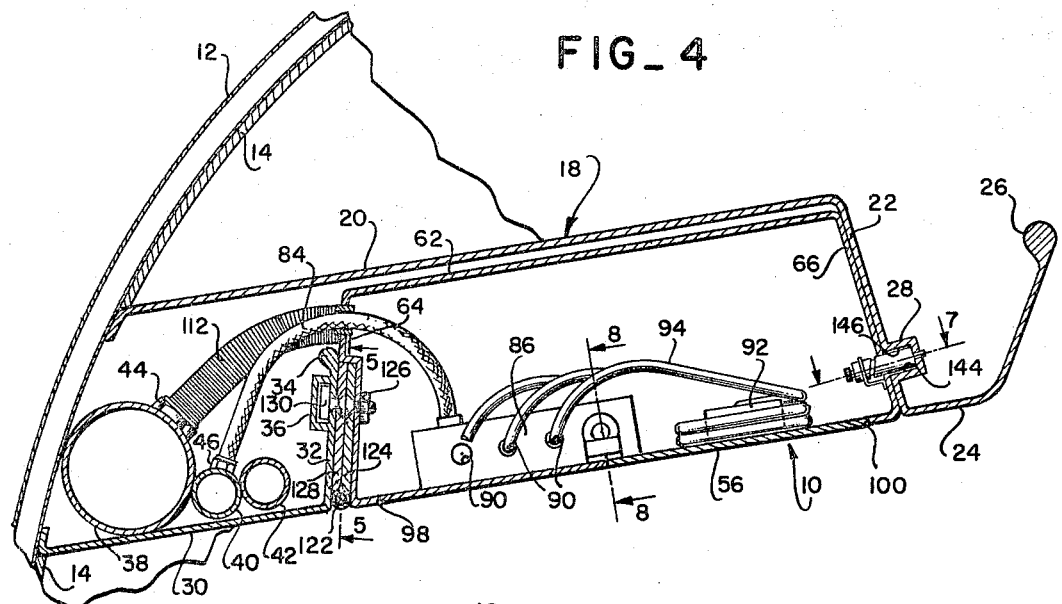

FIGURE 1 is a bottom, rear inside perspective view of an adjustable passenger utility carrier in accordance with this invention, shown as related to a portion of the aircraft structure;

FIGURE 2 is a section taken generally along the line 2—2 of FIGURE 1;
FIGURE 3 is a section taken generally along the line 3—3 of FIGURE 1;
FIGURE 4 is a section taken generally along the line 4—4 of FIGURE 1;
FIGURE 5 is an enlarged view taken generally along the line 5—5 of FIGURE 4 with parts broken away;
FIGURE 6 is a further enlarged view taken generally along the line 6—6 of FIGURE 5;
FIGURE 7 is an enlarged sectional view taken generally along the line 7—7 of FIGURE 4;
FIGURE 8 is an enlarged view taken generally along the line 8—8 of FIGURE 4;
FIGURE 9 is a section taken generally along the line 9—9 of FIGURE 1; and
FIGURE 10 is a section taken generally along the line 10—10 of FIGURE 1.

As an aid to understanding this invention it can be stated in essentially summary form that it is directed to an adjustable passenger utility carrier. First and second longitudinal tracks are provided within an aircraft, one of these tracks preferably being of T construction and the other one provided with guidance means and locking means. The utility carrier fits adjacent these tracks and engages them. The T track is preferably engaged by releasable securing means securing a hinge plate thereagainst. The carrier is preferably secured to the other hinge plates so that it is arranged to swing downwardly on the hinge axis. The carrier is also releasably supported on the other track. Such support preferably includes locking means to lock the carrier with respect to longitudinal movement within the aircraft, which locking means is releasable so as to permit such longitudinal movement. This locking structure is such that a carrier is restrained with respect to motion away from the track but is permitted motion along the track. This locking structure also permits release of that restraint so that the carrier may be hinged down upon the previously described hinges. The carrier preferably contains individual passenger service equipment which is suitably disconnectably and flexibly connected to service equipment lines and conduits positioned within the aircraft. Thus, longitudinal adjustment of the passenger utility carrier, its service and its removal are made easy and convenient.

This invention will be understood in greater detail by reference to the following portion of this specification wherein the drawings are referred to. Referring now to the drawings, the adjustable passenger utility carrier of this invention is generally indicated at 10. Referring primarily to FIGURES 2, 3, 4, 9 and 10 and in part to FIGURE 1, the orientation of the carrier 10 is described. The carrier 10 is installed in an aircraft which has an external skin 12 which is supported upon the usual ribs and stiffeners. A conventional inner trim surface 14 is provided on the interior so as to face the passenger space 16. Positioned on the inside of the aircraft, and extending at approximately passenger head level when the passenger is standing in the aisle between the seats, is hat rack 18. Hat rack 18 has an upper member 20 which is generally horizontal and is sufficiently spaced from the upper interior surface of the aircraft so as to provide space to carry small articles such as pillows, blankets, hats and handbags. Upper member 20 terminates at downwardly directed panel 22 which in turn joins with handrail panel 24 which has at its upward termination handrail 26. Track 28 is integrally formed with panel 22, or is inserted therein, for a functional purpose hereinafter described in more detail.

Trim panel 30 extends inwardly from trim 14 and lies substantially co-planar with handrail panel 24. Inner panel 32 extends upwardly from the inner termination of trim panel 30 and terminates in rounded edge 34 which is spaced below upper member 20. T track 36 is provided in inner panel 32. T track 36 extends parallel to track 28 and its function is described in more detail below.

A plurality of service conduits are positioned above trim panel 30 and interiorly of skin 12 and the structural members associated with skin 12. These conduits include air duct 38, oxygen supply line 40 and electrical conduit 42. These conduits are respectively fitted with a plurality of quick disconnect fittings 44, 46 and 48 along the length thereof.

The carrier 10 is dimensioned so as to be positionable between panels 22 and 32 so that its lower surface is substantially co-planar with panels 24 and 30. Referring more particularly now to FIGURE 1, carrier 10 has rearwardly facing end 50, an angularly upwardly extending lower surface 52, oxygen mask compartment doors 54 and 56, angular lower surface 58 and front end 60, see FIGURE 10. Additionally, carrier 10 is defined by top 62 and side walls 64 and 66.

Carrier 10 contains a plurality of passenger services, as is described in more detail below. Rear end 50 of the carrier 10 carries sign 68 which carries the indicia "Fasten Seat Belts" and "No Smoking." Alternative or additional passenger information may be placed thereon as required. The indicia are selectively illuminated by interior illumination which is controlled from the pilot's compartment. The electrical signals for sign illumination are carried by wires in electrical conduit 42. Disconnect plug 48 connects these signals to flexible electric line 70 which feeds into the carrier 10. Electric line 70 also feeds passenger reading lights 72 and 74, see FIGURES 1 and 3, which are respectively controlled by switches 76 and 78. Electric line 70 also feeds a speaker located behind grill 80 in end 60, see FIGURE 10. Thus, all electrical services to carrier 10 are supplied by line 70.

As is best seen in FIGURE 4, oxygen supply line 40 feeds oxygen through quick disconnect fitting 46 to flexible oxygen supply line 84 which passes into the interior of carrier 10 and connects to manifold 86. Manifold 86 has an interior passage 88, see FIGURE 8, which communicates with a plurality of oxygen mask connectors 90. Oxygen mask 92 is connected to one of the connections 90 by means of tube 94. The interior of carrier 10 above oxygen compartment doors 54 and 56 is of sufficient size to hold three of such masks 92.

Referring now to FIGURE 8, each of the oxygen compartment doors 54 and 56 has a latch 96. Each of the doors is hinged, with door 54 hinged at 98 and door 56 hinged at 100. These doors are arranged so that they are either gravity or spring opened and are restrained in the closed position by latch 96. As is best seen in FIGURE 8, catch 102 is supported on piston rod 104. Piston rod 104 passes through cylinder 106 and extends through an opening in a wall of carrier 10 to extend externally thereof and terminate in button 108. Piston 110 is mounted upon piston rod 104. Spring 112 within cylinder 106 engages on piston 110 so as to urge it to the right to maintain catch 102 in engagement with latches 96. Thus, the doors 54 and 56 are retained in a closed position. Depression of button 108 moves the structure to the left to disengage catch 102 from latches 96 so that the doors come open and the masks 92 fall out. Cylinder 106 is mounted upon manifold 86 and the interior passage 88 within the manifold is connected into cylinder 106 at the right side of piston 110 therein. Thus, when pressure in manifold passage 88 acting upon piston 110 exceeds the force of spring 112, the doors 54 and 56 are released. In the oxygen system 40, the pressure is normally maintained at a suitable value for the use of individual oxygen masks without the automatic release of doors 54 and 56. However, when emergency situations arise, the pressure in oxygen supply line 40 is raised so that the doors 54 and 56 are automatically opened.

Referring now to FIGURE 9, it is seen that air duct 38 is connected by quick disconnect fitting 44 to flexible air duct 112. Flexible duct 112 passes into the interior of carrier 10 and connects to manifold 114. Directable, flow regulatable air outlets 116 and 118 are each connected to manifold 114 and for the controllables supply of air to the passenger space 16. Adjacent the air outlets 116 and 118, see FIGURE 1, is hostess call button 120 which is suitably connected into the electrical circuitry in conduit 42. Thus, all individual passenger services which are preferably arranged adjacent the passenger seating in the aircraft are positioned within carrier 10.

Referring more particularly to FIGURES 4 through 7, the manner in which carrier 10 is supported between panels 22 and 32 is described. Hinge 122 has its plate 124 secured to side wall 64 by means of suitable fastenings 126. Hinge 122 has its other plate 128 lying against panel 32. T bolts 130 are engaged through the openings in plate 128 and into the T track 36. T bolts 130 have T heads 132 which engage within T slot 134 of track 36 so that they are retained therein when in the vertical position shown in FIGURE 5, and can be released therefrom when turned 90°. T bolts 130 have square shanks 136 adjacent T slots 134 and shanks 138 toward head 140 thereof. Wave springs 142 are positioned under the heads 140 in order to maintain the structure firm, and in order to maintain square shank 136 within the narrow portion of T slot 134. Thus, carrier 10 is hinged to swing downwardly from between panels 22 and 32. When swung into the lower position, heads 140 become accessible so that T bolts 130 can be depressed and turned 90° for removal of carrier 10 from T track 36. It should be noted that T bolts 130 are sufficiently free in T slot 134 to permit motion along the length of slot 134 without turning of T bolts 130.

Referring now more particularly to FIGURES 4 and 7, the manner in which the carrier 10 is held into position with respect to track 28 is described in more detail. Track 28 comprises a channel having interior side walls 144 and 146, and bottom 148. Bottom 148 has a plurality of holes 150 spaced along the length thereof. Plunger 152 extends through opening 154 in side wall 66 and extends into the interior of the channel portion of track 28 which is defined by walls 144, 146 and bottom 148. Bracket 156 engages around plunger 152. Bracket 156 is mounted on the interior wall 66. Tooth 158 engages in spiral slot 160 formed in the exterior of plunger 152. Thus, rotation of plunger 152 withdraws it from the channel in track 28. However, with the plunger in place as shown in FIGURES 4 and 7, the carrier 10 is maintained in position and cannot be swung downwardly on hinge 122. With rotation of plunger 152, however, plunger 152 is extracted from the channel and the carrier 10 can be hinged downwardly. Lock plunger 162 extends through the plunger 152 and has knob 164 at its outer end. Pin 166 engages in slot 168 in the interior of plunger 152. Spring 170 engages around lock plunger 162 within the interior of plunger 152. Spring 170 engages upon pin 166 so as to urge lock plunger 162 to the right.

In the position shown in FIGURES 4 and 7, carrier 10 is completely locked in position between panels 22 and 32. If it is desired that carrier 10 be moved longitudinally of the aircraft between these panels, lock plunger 162 is withdrawn by a direct pull on knob 164. This withdraws the end of lock plunger 162 from hole 150 in which it is engaged. In this condition carrier 10 can be slid longitudinally of the aircraft with plunger 152 engaged within the channel track 28 and with T bolts 130 locked in T slot 134. When the carrier 10 is moved to a new position, the plunger 162 is released to engage in a different hole 150. If it is desired that the carrier 10 be swung downwardly around pin 122, knob 164 is engaged, pin 162 is withdrawn, and rotation of knob 164 causes rotation of plunger 152. Such rotation, in conjunction with tooth 158 following spiral slot 160, withdraws plunger 152 from the channel. Thus, the carrier 10 may be swung downwardly for removal or maintenance.

When rearrangement of the passenger seating occurs in the aircraft so that longitudinal positioning thereof is changed, it becomes necessary to move the carrier 10. In order to properly align the carriers 10 with the new seating arrangement, the following steps are performed. Oxygen mask compartment door 56 is opened by depression of button 108. By holding door 54 in place, and placing the oxygen mask 92 thereover, the oxygen masks are retained within carrier 10. Thereupon lock plunger 162 is withdrawn by straight pull on knob 164 and the carrier 10 is moved along track 28 and T track 36 until it is in proper position. Electric line 70, flexible oxygen supply line 84 and flexible air duct 112 are of sufficient length and flexibility to permit reasonable distance of motion of carrier 10. When the carrier 10 is newly positioned, lock plunger 162 is released so that it engages another hole 150. Each of the carriers 10 is thus properly positioned.

Should there be too many carriers 10 in accordance with the new seat arrangement, the knob 164 on the carrier 10 to be removed is withdrawn and rotated so that plunger 152 is also withdrawn from the track 28. Thus, the carrier 10 to be removed is swung downwardly. Door 56 is thereupon closed to retain the contents of carrier 10 and the carrier 10 is then removed from T track 36. Such removal is accomplished by depression of T bolts 130 against wave springs 142 and turning the T bolts 130 90°. T bolt heads 132 are then removed from the narrow slot of T slot 134. Either before or after disengagement of T bolts 130, the several lines are disconnected by disconnection of quick disconnect fittings 44, 46 and 48. Placement of the new carrier 10 is accomplished by opposite order of these steps. Thus, a carrier 10 can be removed for service, or removed or repositioned in accordance with new seat positioning with a minimum of effort.

This invention having been described in its preferred embodiment, it is clear that it is susceptible to numerous changes and embodiments within the scope of this invention and without the exercise of the inventive faculty. Accordingly, the scope of this invention is defined by the scope of the following claims.

We claim:

1. An aircraft having an adjustable passenger utility carrier therein;
   (a) said aircraft including at least first and second tracks, and a plurality of passenger utility carriers mounted in said first and second tracks, means to lock each of said utility carriers with respect to said track to releasably prevent motion of said utility carriers therealong;
   (b) a plurality of service conduits arranged in said aircraft adjacent said tracks, flexible connection means from each of said service conduits, said flexible connection means being connected into one of said passenger utility carriers to supply utility service thereto, said flexible connection means being connected within said utility carrier to provide passenger services therefrom.

2. The adjustable passenger utility carrier structure of claim 1 wherein each of said passenger utility carriers contains illumination means, oxygen dispensing means and ventilation means arranged for the convenience of passengers in said aircraft, said illumination means, said oxygen dispensing means and said ventilation means being connected by said flexible connection means to said service conduits.

3. The structure of claim 2 wherein one of said tracks is a T slot and a hinge is releasably engaged with said T slot track, said hinge also being engaged with said utility carrier so that said utility carrier may be hingedly moved with respect to said T slot track.

4. The structure of claim 3 wherein the other of said tracks is in the form of a channel, said channel having a plurality of spaced holes along the bottom thereof, a plunger movably mounted in said carrier and adapted to engage one of said holes so as to restrain said carrier with respect to said channel track.

5. The structure of claim 4 wherein a second plunger is movably mounted with respect to said carrier and is engageable within said channel, said engagement in said T track and said engagement of said second plunger in said channel being sufficiently loose so that said utility carrier can be moved longitudinally of said tracks when said first plunger is disengaged from a hole in the bottom of said channel.

6. The structure of claim 5 wherein said first and second plungers are coaxial.

7. The structure of claim 6 wherein said second plunger is retained in engagement with said channel by means of a slot in its exterior.

8. The structure of claim 1 wherein said carrier is provided with at least one hingedly mounted bottom door, said door providing the bottom closure of an oxygen mask compartment, a latch on said door and a cylinder connected to said latch, said latch being urged into engagement to retain said door in closed position by means of a spring, said cylinder being connected to said oxygen supply conduit and arranged so that pressure in said conduit urges said latch to disengage said door so that said door remains closed until oxygen pressure in said cylinder exceeds latching force of said spring.

9. A passenger utility carrier in an aircraft, said aircraft being provided with passenger space, first and second tracks positioned generally longitudinally of said passenger space adjacent the upper portion thereof, service conduits extending along the length of said passenger space substantially parallel to said tracks, at least one passenger utility carrier mounted on said tracks and connected by flexible connectors to said conduit, one of said tracks being a T slot and the other of said tracks being a channel, said utility carrier being releasably engaged with said T slot track and with said channel track and being arranged so that upon release from one of said tracks said utility carrier can be moved along the length of the other of said tracks, said flexible utility connections being of sufficient length and sufficient flexibility so as to permit motion of said carrier along said tracks, and means to releasably lock said carrier with respect to motion along said track.

10. The structure of claim 9 wherein said means to releasably lock said carrier with respect to said tracks comprises a plunger selectively engageable in one of a plurality of holes positioned along one of said tracks.

11. The structure of claim 10 wherein one of said tracks comprises a channel and said holes are arranged along the bottom of said channel, a first plunger releasably engageable in one of said holes and a second plunger releasably engageable in said channel so that release of said first plunger permits movement of said carrier along said tracks and release of said second plunger permits release of said carrier with respect to said channel track.

12. The structure of claim 11 wherein said carrier is releasably engaged with the other of said tracks so that said carrier can be slid along the other of said tracks and can be released therefrom.

13. The structure of claim 12 wherein the other of said tracks is a T slot and said carrier is releasably arranged with respect to said T slot by means of a T headed bolt releasably engaged in said T slot track.

14. An aircraft having a passenger space;
   (a) said passenger space having first and second tracks arranged generally along the length of said passenger space toward the upper portion thereof, an electrical conduit, an oxygen conduit and an air conduit in said passenger space and extending substantially parallel to said first and second tracks, said first track being in the form of a T slot and said second track being in the form of a channel;

(b) a passenger utility carrier mounted on said first and second tracks, said passenger utility carrier being hingedly mounted with respect to said first track and being releasably mounted with respect to said second track, said hinged mounting comprising a hinge having first and second plates, said first hinge plate being secured to said passenger utility carrier and said second plate being positioned adjacent said T slot track, a T bolt through said second plate and positioned into said T slot track, said T bolt having a head which is of such dimension as to be retained within said track while in one position and is of such dimension as to be removable from said track when in another position, said T bolt having a shank thereon having flats adapted to maintain said T bolt in its retention position and a spring washer under said bolt adapted to releasably retain said T bolt in its retention position, said hinge being arranged so that said passenger utility carrier can be hingedly moved respect to said first track;

(c) a plurality of holes in said second track spaced along the length thereof, a first plunger mounted in said passenger utility carrier and releasably engageable in one of said holes for retention of said passenger utility carrier with respect to motion along the length of said track, a second plunger positioned around said first plunger and releasably engaged in said channel, said first plunger being spring loaded for engagement in one of said retention holes and said second plunger having an angular track thereon for retention of said second plunger in said channel;

(d) said passenger utility carrier containing electrical, oxygen and ventilation services adapted for passenger needs therein, said electrical, said oxygen and said ventilation services being connected by flexible connectors to said electrical, said oxygen and said air conduits in said aircraft, each of said electrical, said oxygen and said ventilation air connectors being quickly releasable for ease of removability and replacement of said passenger utility carrier with respect to said aircraft.

No references cited.

MILTON BUCHLER, *Primary Examiner.*

T. W. BUCKMAN, *Assistant Examiner.*